Dec. 22, 1931.  E. M. SCHEID  1,837,294

REFRIGERATING APPARATUS

Filed Aug. 12, 1929

Edward M. Scheid INVENTOR

BY

Spencer, Hardman & Feli ATTORNEYS

Dec. 22, 1931.　　　　E. M. SCHEID　　　　1,837,294

REFRIGERATING APPARATUS

Filed Aug. 12, 1929

Edward M. Scheid INVENTOR

BY

Spencer, Hardman & Felix ATTORNEYS

Patented Dec. 22, 1931

1,837,294

UNITED STATES PATENT OFFICE

EDWARD M. SCHEID, OF DAYTON, OHIO, ASSIGNOR TO FRIGIDAIRE CORPORATION, OF DAYTON, OHIO, A CORPORATION OF DELAWARE

REFRIGERATING APPARATUS

Application filed August 12, 1929. Serial No. 385,190.

This invention relates to refrigerating apparatus and to a method of and means for manufacturing certain parts thereof.

One of the objects of the invention is to provide an improved method of and apparatus for making helically corrugated sheet metal shells for use in refrigerating apparatus.

More specifically it is an object of the invention to provide a collapsible mandrel upon which the helically corrugated shell may be formed and which may be readily removed from the shell so formed.

Further objects and advantages of the present invention will be apparent from the following description, reference being had to the accompanying drawings, wherein a preferred form of the present invention is clearly shown.

In refrigerating apparatus of the character disclosed in the application of Jesse G. King, Serial No. 250,407, filed January 30, 1928, there is used a helically corrugated sheet-metal shell of uniform thickness, the corrugations of which terminate within the length of the shell. This shell is placed in contact with a plain cylindrical shell so that the helical corrugations form a tortuous passage for fluid between the shells. This invention is concerned with the method of and apparatus for economically manufacturing such corrugated shells.

Figure 1:
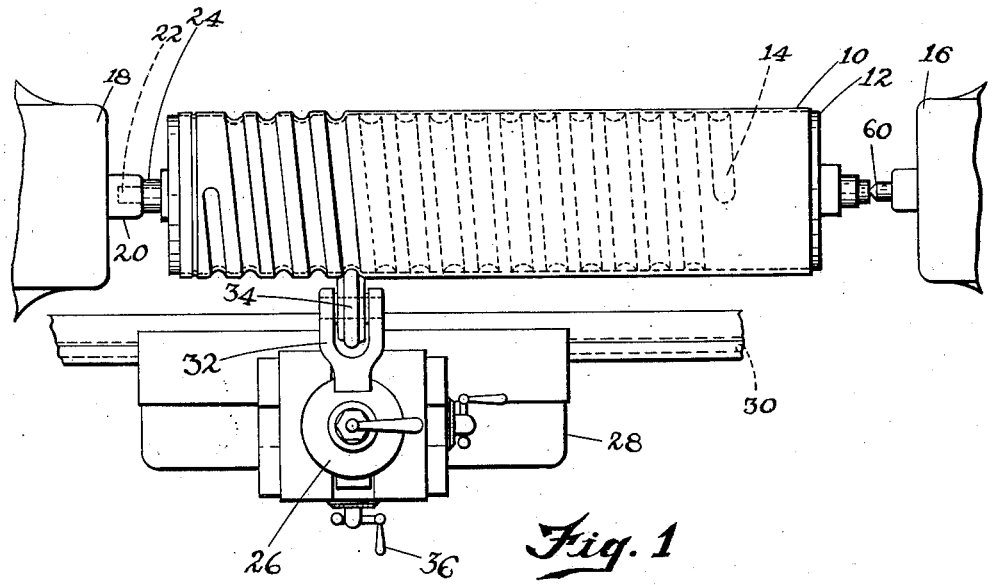
Fig. 1 is a plan view of a portion of a machine adapted to carry out the process of invention.

Referring to the drawings a plain cylindrical sheet-metal shell or tube 10 is placed upon a cylindrical mandrel 12 in which is formed a helical groove 14, which as shown extends substantially the length of the tube but terminates short of the ends of the tube. The mandrel is placed in a lathe having a tail-stock 16 and a head-stock 18 which includes a chuck 20 having a square hole 22 for receiving the squared end 58 of the mandrel shaft 24 and rotating the latter. The usual lathe tool post 26 is mounted on the usual carriage 28 having the usual automatic screw feed 30. Mounted in the tool post is a rolling tool including a yoke or fork 32 in which is pivoted a roller 34 the face of which corresponds to the shape of the groove 14. The shaft 24 is rotated and the automatic screw feed 30 is likewise rotated in synchronism with the shaft 24 at such a speed that the tool post travels along the lathe bed at a speed corresponding to the pitch of the groove 14, thus keeping the roller always in register with the groove. As the work is rotated the roller is fed into the groove by the feed screw 36 and gradually deforms or rolls the shell into the groove as shown at the left of Fig 1.

Figure 2:
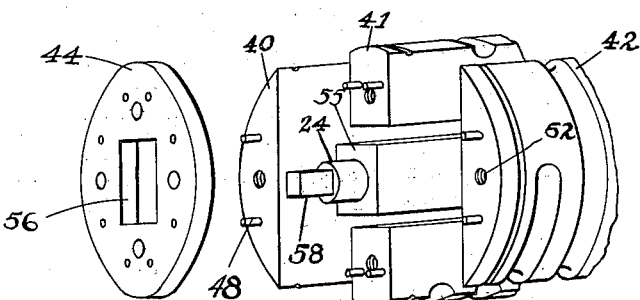
Fig. 2 is an exploded perspective view of a portion of an improved mandrel embodying the invention.
Figures 3, 4:
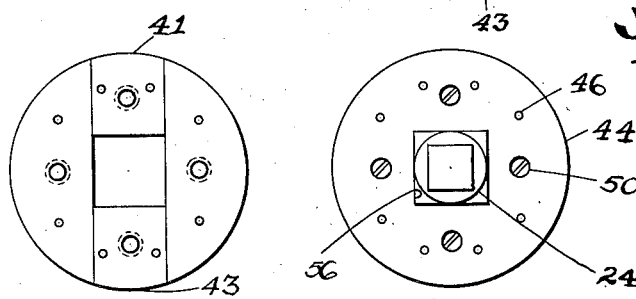
Fig. 3 is an end view of an assembled mandrel, the end plate being removed.
Fig. 4 is an end view of the complete assembled mandrel.
Figure 1:
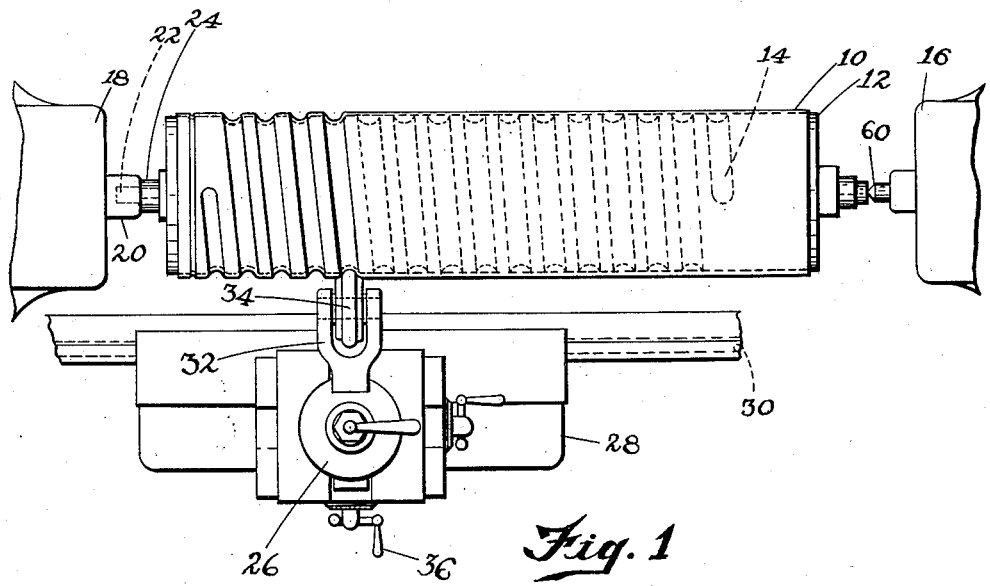
Figure 2:
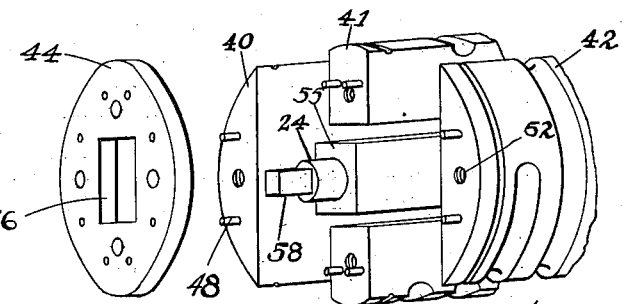
Figure 3:
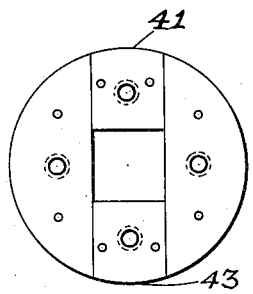
Figure 4:
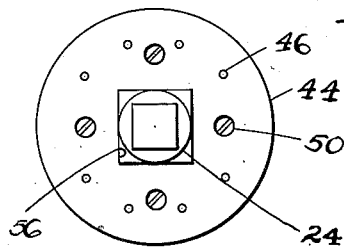

In order to remove the mandrel from the corrugated shell, the mandrel is preferably formed of four complementary portions 40, 41, 42, and 43 shown best in Fig. 2. These complementary members have plane inner surfaces, the inner surfaces of opposite members being parallel. The members are held together in position to form the helically grooved cylinder by end plates or cheek members 44 which have holes 46 for receiving pins 48 rigidly mounted in the ends of the complementary members. The pins and openings hold the complementary members against the force of the tool 34, and the whole mandrel is held in assembled relation by screws 50 passing through the cheek members and secured in screw holes 52 in the complementary members. Within the mandrel is placed a shaft 24 which has a square portion or parallelepiped 55 to fit in a square opening 56 in the cheek members in order to rotate the mandrel. The shaft is provided at one end with the square portion 58 which fits in the hole 22 of the lathe chuck as has been previously described. The opposite end of the shaft is provided with the usual conical depression which fits on the spindle 60 of the tail-stock.

After the shell has been grooved or corrugated the mandrel is removed from the lathe and the cheek plates 44 removed from the mandrel. The shaft can then be removed from the complementary members and the members 41 and 43 moved toward each other a sufficient distance to clear the corrugations in the shell after which they may be withdrawn endwise from between the members 40 and 42. Thereafter the members 40 and 42 may be moved inwardly and withdrawn endwise from the shell.

While the form of embodiment of the invention herein disclosed constitutes a preferred form, it is to be understood that other forms might be adopted, all coming within the scope of the claims which follow.

What is claimed is as follows:

1. A mandrel for making helically corrugated sheet-metal shells, comprising in combination a plurality of complementary members having curved outer portions forming a cylinder, said members having pitched registering grooves forming a helical groove extending substantially throughout the length of the cylinder but terminating between its ends.

2. A mandrel for making helically corrugated sheet-metal shells, comprising in combination four complementary members forming a cylinder, said members having pitched registering grooves forming a helical grove on the cylinder, the inside surface of the members being plane and the surfaces of opposite members being parallel.

3. A mandrel for making helically corrugated sheet-metal shells, comprising in combination a plurality of complementary members forming a cylinder, said members having pitched registering grooves forming a helical groove on the cylinder, cheek members, and pins secured to one set of members engaging openings in the other set of members to hold the complementary members in position.

4. A mandrel for making helically corrugated sheet-metal shells, comprising in combination a plurality of complementary members forming a cylinder, said members having pitched registering grooves forming a helical groove on the cylinder, cheek members, pins secured to one set of members engaging openings in the other set of members to hold the complementary members in position, said cheek members having aligned openings at least one of which is non-circular, and a shaft extending through said openings for supporting the mandrel, said shaft having a non-circular portion engaging said non-circular opening for rotating the mandrel.

5. A mandrel for making helically corrugated sheet-metal shells, comprising in combination a plurality of complementary members forming a cylinder, said members having pitched registering grooves forming a helical groove on the cylinder, cheek members, and means for securing the cheek members to the complementary members to hold the complementary members in position.

6. A collapsible mandrel for making helically corrugated sheet-metal shells, comprising in combination a parallelepiped and a plurality of complementary members having their inner sides fitting against the parallelepiped and having their outer sides matched and curved to form a cylinder, said complementary members having pitched registering grooves on their outer sides forming a helical groove.

In testimony whereof I hereto affix my signature.

EDWARD M. SCHEID.